Figure 1:
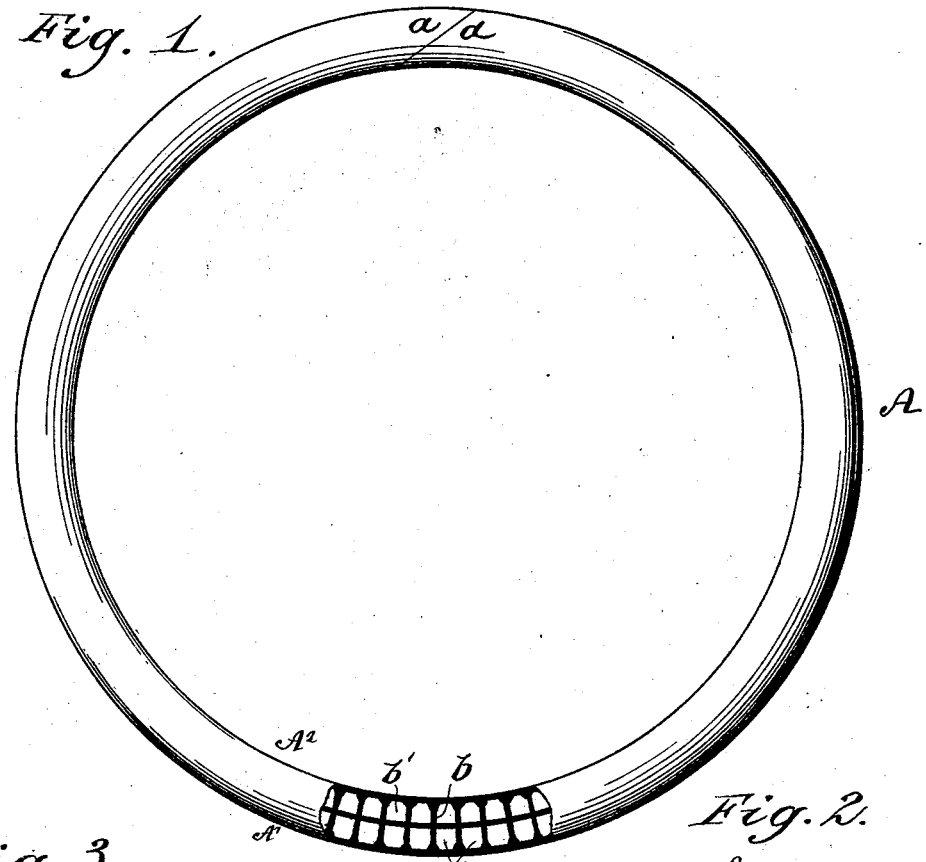

(No Model.)

T. S. BUCK & B. G. VOLGER.
RUBBER TIRE.

No. 508,466.  Patented Nov. 14, 1893.

WITNESSES:
John W. Deemer
Milton Goldsmith

INVENTORS
Taylor S. Buck.
Bernard G. Volger.
BY H. A. West,
ATTORNEY.

THE NATIONAL LITHOGRAPHING COMPANY,
WASHINGTON, D. C.

United States Patent Office.

TAYLOR S. BUCK AND BERNARD G. VOLGER, OF NEW YORK, N. Y.

RUBBER TIRE.

SPECIFICATION forming part of Letters Patent No. 508,466, dated November 14, 1893.

Application filed November 30, 1892. Serial No. 453,595. (No specimens.)

*To all whom it may concern:*

Be it known that we, TAYLOR S. BUCK and BERNARD G. VOLGER, citizens of the United States, and residents of New York, in the county of New York and State of New York, have invented certain new and useful Improvements in Tires, of which the following is a specification.

Our invention relates to india rubber tires for use on bicycles and other pedal vehicles, or on sulkies, or for other purposes, and our object is to provide a tire which shall be flexible similar to the so-called pneumatic tire without the evils incident to cutting or puncturing, which, in flexible tires heretofore used renders them valueless. This object we attain by forming the tire out of india rubber, or other suitable flexible material, in lengths, or in hoop form, the same being constructed with a series of internal flexible supports which yield with the compression of the outer walls of the tire and return the walls to normal shape as soon as the compressing force or weight is removed or shifted. The said internal supports are by preference in the form of flexible partitions arranged to form small compartments or cells to confine the air within them in small pockets which form air cushions to add to the stability of the tire and enable it to be comparatively light and to maintain the tire from collapse in case the outer wall be cut or punctured.

In one form of our invention the air cells are made on opposite sides of a central strip by transverse and circumferential partitions, while in another form the cells are continuous; and the cells may be round, angular, or of any desired form.

The tire may be of any desired form in cross-section, and we find it most convenient to form it in two halves which are cemented together, forming the complete tire, and before cementing we find it more satisfactory to secure a thin strip or sheet of india rubber, or other suitable material, between the two halves, thus multiplying the cells and hermetically sealing them and strengthening the whole tire, so that in case of cutting or puncturing, the tire would have to be punctured in each of the cells in the same section both above and below the strip before exhaustion of air would result in materially weakening the tire. The central strip also serves to strengthen the entire tire; but the central sheet may be omitted and the walls and interior supports or partitions cemented together edge to edge. In case the tire is made of other form the cells may be continuous and closed by a separate outer sheet or strip of rubber cemented over them to the edges of the tire.

Figure 3:
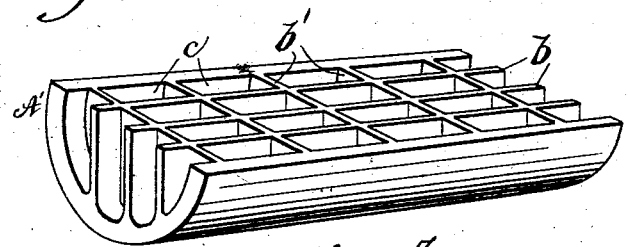
Figure 2:
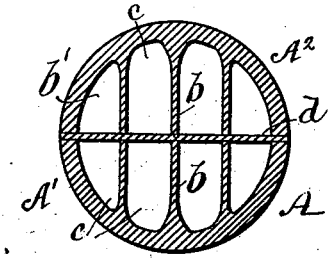
Figure 4:
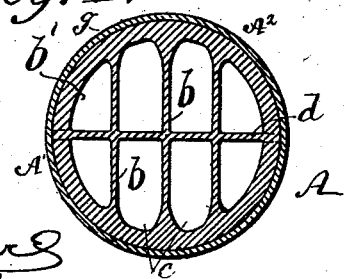

In the accompanying drawings to which reference is made Figure 1 is a broken side elevation of a tire made in accordance with our invention. Fig. 2 is an enlarged transverse sectional view of the same. Fig. 3 is a detailed perspective view of a portion of one-half of the tire. Fig. 4 is a sectional view showing the tire wrapped with canvas or other suitable material for additional strength.

The tire A of india rubber is preferably made of a straight length turned into hoop form and the ends cemented together, the ends being preferably scarfed as shown at $a$ $a$ to form a lap joint. The tire is formed with interior supports $b$ $b'$ which form air cells $c$. The tire as shown in Figs. 1, 2, 3 and 4 is made of two halves $A'$ $A^2$. These are duplicates of each other, and are formed in a mold by pressing the raw rubber therein, and then vulcanizing the rubber by heat in the well known manner. When the tire is made complete two molds will be required circular in form and of proper size so that the product of one will fit within that of the other. The sections $A'$ $A^2$ when vulcanized and removed from the mold are placed edge to edge and cemented firmly with rubber or other suitable cement making the tubular formation and hermetically sealing the cells. In most cases a strip $d$ of india rubber will be first cemented to one of the sections and to the edges of the cells, and then the other section will be secured to the strip $d$ and hermetically sealed so that there will be a set of cells and supports on each side of the central strip.

In some cases we may wrap the tire as shown in Fig. 4 with a covering $g$ of canvas or other suitable material and a separate wrapping may be applied at the joint $a$ $a$ if desired.

Having thus described our invention, what we claim as new, and desire to secure by Letters Patent, is—

1. An elastic tire formed of two circular sections each formed with corresponding air cells and cemented together face to face substantially as described.

2. An elastic tire formed of two circular sections each formed with air cells and cemented to opposite sides of a central elastic strip substantially as described.

3. An elastic tire composed of two sections D-shaped in cross section each formed with partitions flush with the edges of the sections in combination with a central flexible strip to the side of which the sections and partitions are cemented substantially as described.

TAYLOR S. BUCK.
BERNARD G. VOLGER.

Witnesses:
H. A. WEST,
MILTON GOLDSMITH.